(12) United States Patent
Yokoyama

(10) Patent No.: US 7,819,653 B2
(45) Date of Patent: Oct. 26, 2010

(54) LIGHT TRANSMISSIVE STAMPER

(75) Inventor: Ryuichi Yokoyama, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 414 days.

(21) Appl. No.: 12/114,432

(22) Filed: May 2, 2008

(65) Prior Publication Data

US 2008/0286401 A1 Nov. 20, 2008

(51) Int. Cl.
*B29C 59/00* (2006.01)
*B29C 33/56* (2006.01)

(52) U.S. Cl. .................................. 425/385; 249/115

(58) Field of Classification Search .......... 425/385; 264/293; 249/115
See application file for complete search history.

(56) References Cited

U.S. PATENT DOCUMENTS

| | | | |
|---|---|---|---|
| 5,714,222 A | 2/1998 | Yokoyama | 428/64.1 |
| 7,175,962 B2 | 2/2007 | Kouchiyama et al. | 430/270.1 |
| 7,344,822 B2 | 3/2008 | Kouchiyama et al. | 430/270.1 |
| 7,520,742 B2 * | 4/2009 | Motowaki et al. | 425/385 |
| 2004/0182820 A1 * | 9/2004 | Motowaki et al. | 216/44 |
| 2005/0133954 A1 * | 6/2005 | Homola | 264/219 |
| 2006/0180271 A1 | 8/2006 | Yokoyama et al. | 156/269 |
| 2006/0199104 A1 * | 9/2006 | Kouchiyama et al. | 430/270.1 |
| 2008/0171290 A1 | 7/2008 | Kouchiyama et al. | 430/289.1 |

FOREIGN PATENT DOCUMENTS

| | | |
|---|---|---|
| JP | 2003-315988 | 11/2003 |
| JP | 2004-152465 | 5/2004 |

\* cited by examiner

*Primary Examiner*—Maria Veronica D Ewald
(74) *Attorney, Agent, or Firm*—Fitzpatrick, Cella, Harper & Scinto

(57) ABSTRACT

Provided is a light transmissive stamper which does not generate a residue of a curable resin even when the stamper including a support substrate and an inorganic resist is used to mold a substrate. The light transmissive stamper is used when an information pattern of an optical recording medium is formed using a curable resin. The light transmissive stamper includes a light transmissive support substrate, a light transmissive inorganic resist layer having an uneven pattern corresponding to an information pattern formed therein, and a peeling layer provided on a side surface of the light transmissive stamper and having a higher peelability from the curable resin than a peelability from the light transmissive support substrate.

9 Claims, 4 Drawing Sheets

LIGHT TRANSMISSIVE STAMPER

BACKGROUND OF THE INVENTION

1. Field of the Invention

The present invention relates to a stamper using an inorganic resist, and more particularly, to a light transmissive stamper.

2. Description of the Related Art

In recent years, an optical recording medium is employed as a recording medium for recording various informations in, for example, the audio visual field including computers. Also, along with the populization of mobile computers and diversification of information, there is a need for a small optical recording medium of a large capacity.

The optical recording medium is formed with a recording film on a substrate and recording is performed on the recording film through an optical energy, which provides a signal pattern which is read by a drive. For protection of the film surface, the recording film is made through bonding of an organic protective layer and a substrate to constitute a optical recording medium. Moreover, in order to increase the capacity, there is employed, for example, an optical recording medium in which substrates each having a recording film are opposed to each other and are bonded.

However, a still larger capacity is required for an optical recording medium for high-definition contents in terrestrial digital broadcasting, or the like. The increase of track recording density of an optical disk greatly depends on a laser wavelength $\lambda$ of a reproducing optical system and a numerical aperture NA of an objective lens. The detectable limit of a spatial frequency at the time of reproducing a signal is approximately $NA/\lambda$. Accordingly, in order to realize the increase of the density with the existing optical disks, the laser wavelength $\lambda$ of the reproducing optical system can be shortened and the numerical aperture NA of the objective lens can be increased, thereby increasing the track recording density. Setting an aperture ratio larger enables reduction in a beam spot size to the wavelength limit. However, the stability against the inclination of the optical recording medium is remarkably reduced, so that the thickness of the substrate needs to be reduced. Such a technology is adopted so that the substrate on the light incident side is made thin as an optical recording medium, and a recording medium of a large capacity is commercialized (for example, Blu-ray Disk (trade name; hereinafter referred to as "BD")).

Also, the fine processing technology for improving the storage capacity of an optical disk is dramatically advanced through a mastering technology of performing a pattern formation of the optical disks. The advance has been achieved by shortening an exposure wavelength of an exposure device used in mastering, improving accuracy in exposure pattern control, and improving sensitivity of a photoresist.

However, in a production method in which an existing photoresist is used, it takes four hours or more to expose a single master stamper, which is a precision mold and used in BD production. Accordingly, studies have been conducted to establish a high speed production process.

In order to solve the problem, a method which does not use an existing resist formed of an organic material but uses a resist formed of an inorganic material has been proposed and studied in various companies.

For example, Japanese Patent Application Laid-Open Nos. 2003-315988 and 2004-152465 propose a master disc for a stamper using an inorganic material composed of an incomplete oxide of a transition metal as a resist. In these patent documents, it is found that when the oxygen content in a transition metal oxide is made less than the oxygen content of a stoichiometric composition corresponding to valence which the transition metal can take, absorption of an ultraviolet ray or a visible light of the oxide (incomplete oxide) is increased. According to the inventions in the above-mentioned patent documents, by using an incomplete oxide of the transition metal as a resist material, fine exposure and development applicable to the production of the BD can be conducted, using an ultraviolet ray or a visible light as an exposure source. Further, exposure at the rate of 4.92 m/sec, which is equal to the rate of recording/reproduction in the BD, is enabled and the exposure rate can also be improved dramatically.

Further, tungsten oxide (WO) and molybdenum oxide (MoO) used as an inorganic resist has transmissivity with respect to an ultraviolet ray used when curing a photocurable resin and can be therefore used for formation of an intermediate layer (photocurable resin is mainly used) of an optical recording medium having a multilayer structure. For example, by using a material having transmissivity such as quartz glass as a support substrate of a stamper, and by providing, on the light transmissive support substrate, a light transmissive inorganic resist layer having an uneven pattern formed thereon, ultraviolet ray irradiation from the stamper side is enabled when an intermediate layer of an optical recording medium having a multilayer structure is formed, which is advantageous.

Moreover, in general, the stamper using an inorganic resist exhibits an excellent flatness such that an electrocasting process or polishing process is not necessary. Also from this viewpoint, the stamper using an inorganic resist is particularly advantageous for forming an intermediate layer of an optical recording medium having a multilayer structure (hereinafter, abbreviated as "intermediate layer"), which is required to have flatness.

A manufacturing process of a stamper using an inorganic resist is described below. First, a support substrate for a stamper is cleaned. Glass or a Si wafer is employed as the support substrate. Next, an inorganic resist layer is formed on the support substrate by sputtering to produce a master disk of a stamper. Subsequently, exposure of a predetermined uneven pattern is performed with a laser beam on the thus produced master disk of a stamper, and then alkaline development is performed to produce a stamper having an inorganic resist layer which has an uneven pattern formed thereon, on the support substrate.

However, an inorganic resist is not formed in a side surface portion of the stamper produced by the above-mentioned procedure, and the support substrate is exposed in the side surface portion of the stamper. When the stamper having the support substrate exposed in the side surface portion thereof is used to form a substrate or an intermediate layer by using a curable resin as a material through a photopolymer method (hereinafter, abbreviated as "2P method"), the curable resin which flows out to the side surface portion of the stamper at the time of molding and the support substrate are adhered to each other, which causes difficulty in peeling the substrate or the intermediate layer from the stamper. Besides, the curable resin is adhered to the exposed support substrate after peeling and remains on the exposed support substrate, so that a residue of the curable resin are generated on the side surface portion of the stamper. In the case where a residue of the curable resin is generated on the side surface portion of the stamper, a localized gap is caused between the stamper and the substrate or the intermediate layer at the time of molding. As a result, the curable resin cannot be spread uniformly over the entire stamper surface and satisfactory molding cannot be performed. Incidentally, a resin which cures with an ultraviolet ray or a visible light, such as an acrylic resin, a methacrylic resin, or an epoxy resin, is generally employed as the curable resin.

For that reason, when a residue of a curable resin is generated on a side surface portion of a stamper, a step of removing the residue and a step of cleaning the stamper are indispensable, which remarkably degrades the productivity. In addition, there is a problem that the lifetime of the stamer is shortened and the production cost increases.

In particular, in the case where glass is used as the support substrate and an ultraviolet curable epoxy resin is used as the curable resin, occurrence of the residues is remarkably apparent. It is considered that this is because the glass (support substrate) which is exposed in the side surface portion of the stamper and the curable resin which flows out at the time of molding a substrate are reacted with each other to cause a strong adhesion force.

Further, in the case where a molded substrate and the stamper has a substantially equal diameter, or the stamper has a smaller diameter than the molded substrate, it is difficult to completely prevent flowing out of the curable resin to the stamper side surface at the molding of the substrate, so that molding defects or residues are liable to occur.

That is, in the conventional stamper using an inorganic resist, the exposure of the support substrate in the side surface portion of a stamper is not taken into account. Therefore, in the stamper using an inorganic resist, there has been required a method in which a residue of a curable resin is not generated in the stamper side surface at the molding.

As described above, in the stamper using an inorganic resist, the support substrate is exposed in the side surface portion thereof. Therefore, there is posed a problem that in the case where such a stamper is used to form a substrate or an intermediate layer through the 2P method, the support substrate which is exposed in the stamper side surface and the curable resin which flows out at the molding are adhered to each other, which causes a residue in the side surface portion of the stamper.

SUMMARY OF THE INVENTION

An object of the present invention is to provide a stamper which does not generate a residue of a curable resin even in a case where a stamper including a support substrate and an inorganic resist is used to mold a substrate. In particular, an object of the present invention is to provide a light transmissive stamper which does not generate a residue of a curable resin at the time of molding an intermediate layer, in which a material having a transmissivity, such as glass, is used as the support substrate and an inorganic material having transmissivity is used as a resist material to produce the light transmissive stamper.

According to the present invention, there is provided a light transmissive stamper, which is used when an information pattern of a medium is formed by using a curable resin, including: a support substrate having transmissivity; a light transmissive inorganic resist layer provided on the support substrate and having formed therein (or thereon) an uneven pattern corresponding to an information pattern, the light transmissive inorganic resist layer including as a main component an incomplete oxide of an inorganic metal having an oxygen content less than an oxygen content of a stoichiometric composition corresponding to a valence which the inorganic metal takes; and a peeling layer having a higher peelability from the curable resin than a peelability from the support substrate and provided on a side surface of the support substrate.

Further features of the present invention will become apparent from the following description of an exemplary embodiment with reference to the attached drawings.

DESCRIPTION OF THE EMBODIMENT

Figure 1A:
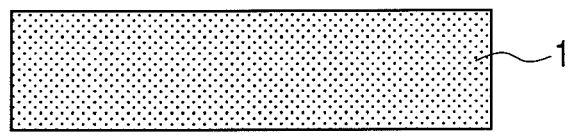
FIGS. 1A, 1B, 1C, and 1D are schematic diagrams illustrating a production method of a light transmissive stamper according to Example 1 of the present invention.

Hereinafter, the stamper and the production method of the stamper according to the present invention are described in detail.

The stamper according to the present invention is characterized in that an inorganic resist layer having an uneven pattern corresponding to an information pattern formed on a support substrate and a peeling layer which is provided on a side surface of the stamper. With this structure, without generating a strong adhesion force between the side surface of the stamper and a curable resin (substrate, intermediate layer, or the like) for forming an information pattern, the stamper and the curable resin (substrate or intermediate layer) having the information pattern formed thereon can be peeled from each other with ease.

There are no particular limitations on the material of the support substrate. For example, soda-lime glass, quartz glass, alkali glass, a Si wafer, a resin plate, a metal plate, and the like can be used. The present invention is particularly effective in the case where general-purpose glass is used as a support substrate. With the use of the support substrate having transmissivity (hereinafter, abbreviated as "light transmissive support substrate"), such as glass, when an intermediate layer of an optical recording medium having a multilayer structure is molded, irradiation with an ultraviolet ray or a visible light from a stamper side is made possible.

There are no particular limitations on the material of the inorganic resist layer, as long as the material is an inorganic material which exhibits a crystalline/amorphous phase change by heat. For example, tellurium (Te), molybdenum (Mo), tungsten (W), an oxide or incomplete oxide thereof, or a material including a mixture thereof as a main component can be used. Of those materials, an incomplete oxide of W, Mo, or Te exhibits a high peelability from a curable resin and has transmissivity with respect to an ultraviolet ray or a visible light necessary for curing the curable resin. Accordingly, the incomplete oxide of W, Mo, or Te is suitable for a material of an inorganic resist layer of a stamper for molding an intermediate layer. The reason is that by employing a stamper including an inorganic resist having transmissivity (hereinafter, abbreviated as "light transmissive inorganic resist") and a light transmissive support substrate, when an intermediate layer is molded, irradiation with an ultraviolet ray or a visible light from the stamper side is made possible. Incidentally, the term "incomplete oxide" herein employed refers to an oxide which has an oxygen content less than the oxygen content of the stoichiometric composition corresponding to a valence that the metal can take, that is, an oxide which has an oxygen content less than the stoichiometric oxygen content. Further, for the material of the inorganic resist layer, it is particularly desirable to employ an inorganic material in which the selectivity to a developer between an exposed portion and an unexposed portion is high for the purpose of formation of an uneven pattern with a developer in subsequent steps.

Furthermore, in order to improve the peelability from a substrate and the characteristics of the inorganic resist layer, In, Ga, Sb, Se, Pb, Ag, Au, As, Co, Mo, W, Pd, Ti, Bi, Zn, an oxide or an nitride of Si or the like, or an alloy including at least two of those metals may be used as an additive for the inorganic resist layer.

It is desirable to calculate the thickness of the inorganic resist layer based on the selectivity with respect to a developer of an exposed portion and an unexposed portion.

In the case where the stamper is used as a stamper (light transmissive stamper) having transmissivity with respect to an ultraviolet ray or a visible light, it is desirable to take into account the transmittance at a range of wavelength necessary for curing a curable resin which serves as a material of an intermediate layer and to select the material and the thickness of a light transmissive support substrate and a light transmissive inorganic resist layer.

In addition, in order to suppress the thermal diffusion of the exposure energy in the inorganic resist layer at the time of exposure, a layer which includes a material having a lower thermal conductivity than the support substrate may be formed between the support substrate and the inorganic resist layer. Examples of the material having a lower thermal conductivity include amorphous silicon, silicon nitride, and alumina.

The inorganic resist layer can be selected from a negative resist and a positive resist according to an arbitrary uneven pattern. In the case where an inorganic material including WO, MoO, tellurium oxide (TeO), or the like is used as the light transmissive inorganic resist layer, the film forming conditions can be changed to adjust the oxygen content of the inorganic material, whereby the inorganic material is allowed to function as any one of a negative resist and a positive resist.

The formation method of the inorganic resist layer can also be selected from an evaporation method, a CVD method, and the like, in addition to a sputtering method. There are no particular limitations on the formation method.

For the peeling layer, there can be used a material having a higher peelability from a curable resin serving as a material of a substrate or an intermediate layer than a peelability from a support substrate. Incidentally, as a curable resin serving as a material of a substrate or an intermediate layer, there is generally employed a resin which cures with an ultraviolet ray or a visible light, such as an acrylic resin, a methacrylic resin, or an epoxy resin.

For example, for the peeling layer, an inorganic material which can be used as an inorganic resist can be employed. Further, the peeling layer can be made of the same inorganic material as the inorganic resist layer. In this case, a layer of an inorganic resist can be formed on an upper surface of a support substrate through a technique such as sputtering, and the inorganic resist can be simultaneously formed as a peeling layer on a side surface of the support substrate. The inorganic material which is used for the inorganic resist layer has excellent peelability from a curable resin, excellent adhesion to a support substrate, and excellent durability, so that the inorganic material is suitable for the peeling layer. Further, since the same material as the inorganic resist layer is used as it is as the peeling layer, the peeling layer can be formed without necessity of any special steps. In particular, in the case of a positive inorganic resist layer, since the etch resistance of an unexposed portion is high, the positive inorganic resist layer can be formed as the peeling layer on the side surface of the stamper. On the other hand, in the case where a negative inorganic resist is used as the peeling layer, the peeling layer (negative inorganic resist) can be modified through exposure to improve the etch resistance, thereby preventing the disappearance of the peeling layer. The term "modification" herein employed refers to a change in phase state. The term "phase states" herein employed includes, for example, a crystalline state, an amorphous state, a transition state in which crystallinity increases from an amorphous state to a crystalline state, and a state in which different crystalline states are mixed with each other. The term "amorphous state" includes a state in which phase states with different densities are mixed with each other. The change in phase state includes a change from an amorphous state to a crystalline state, a change from a crystalline state to an amorphous state, a change in crystallinity in an amorphous state or in a crystalline state, and a change in density in an amorphous state. For irradiation with a light beam in the exposure, there can be employed, for example, a higher harmonic generator including a semiconductor laser, a gas laser such as an argon laser, and a YAG laser (solid laser). In the case of performing the exposure, the phase state of an inorganic resist can be changed by adjusting the irradiation conditions (power, irradiation speed, focusing conditions, and the like) of the light beam.

The material of the peeling layer is not limited to the same material as the material of the inorganic resist layer. There can be used a silicone resin, a fluororesin, a cycloolefin resin, or an organic material serving as a general release agent, mold release agent, or lubricant. In addition, in order to improve the adhesion between the organic material and the support substrate, it is possible to form a silane coupling agent layer on the support substrate or to add a silane coupling agent to the organic material. Particularly, for the silicone resin, there is less degradation due to heat or an ultraviolet ray, and the adhesion to an inorganic substance can be provided by silanol groups in the resin at the time of forming the peeling layer, as is the case with the silane coupling agent. Furthermore, peelability and water repellency can be provided by the surface tension of the surface of the resin. Therefore, the silicone resin is a suitable material. The formation of the peeling layer with the use of the organic material may be performed before the formation of the inorganic resist layer or after the development step described below, as long as the peeling layer is formed on the side surface of the support substrate of the produced stamper. Moreover, depending on the degree of degradation of the peeling layer, a new peeling layer can be repeatedly formed. In order to prevent contamination of an effective region of the stamper during the peeling layer formation and to uniformly form the peeling layer, it is desirable to form the peeling layer on the support substrate before the formation of the inorganic resist layer. The peeling layer including the organic material can be formed on the support substrate through a known coating method such as spin coating, dipping, or slit coating. In the case where the peeling layer including the organic material is formed on the support substrate, the surface of the peeling layer can be subjected to a known surface treatment method such as a plasma treatment, an ashing treatment, or a UV/ozone treatment as needed, thereby preventing the reduction in adhesion between the peeling layer and the inorganic resist layer.

The thickness of the peeling layer may be adjusted depending on a material to be used for the peeling layer so that the peeling layer is provided with durability enough to be resistant to repeated use. In the case where an inorganic material is used, for example, the thickness is preferably within the range of 1 nm to 1,000 nm, and more preferably 3 nm to 200 nm. In the case where an organic material is used, for example, the thickness is preferably within the range of 1 nm to 10,000 nm, and more preferably 500 nm to 5,000 nm.

Figure 1B:
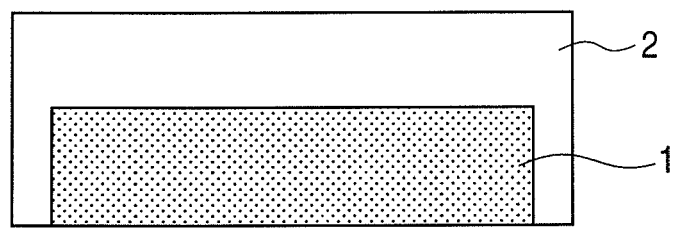
Figure 1C:
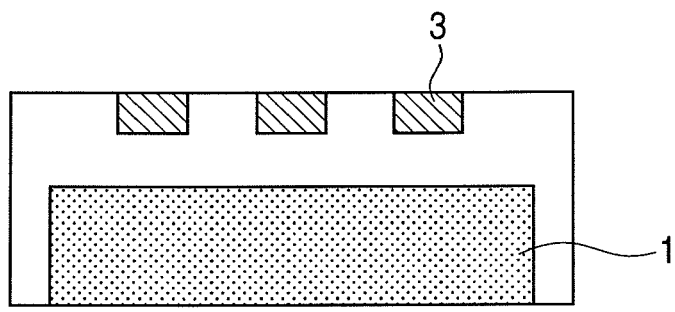
Figure 1D:
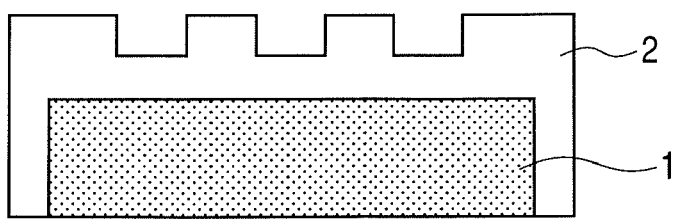

Hereinafter, an example of a production method of a stamper using an inorganic resist according to the present invention is described with reference to FIGS. 1A to 1D.

In a first step, a support substrate 1 is cleaned. The cleaning may be performed by any cleaning method such as dry cleaning or wet cleaning, as long as foreign matters can be removed from the surface of the support substrate 1.

In a second step, an inorganic resist layer 2 is formed on the support substrate 1 through sputtering or the like. For the peeling layer, the same inorganic resist is formed on the side surface of the support substrate 1 at the same time of the above formation of the inorganic resist layer 2 on the support substrate 1, thereby obtaining the peeling layer. In the formation of the peeling layer, the film formation amount or the like can be adjusted by suitably adjusting the size, disposition or the like of the target and support substrate at the time of sputtering.

In a third step, exposure of an uneven pattern corresponding to an information pattern is performed on the inorganic resist layer 2 by use of a laser beam.

In a fourth step, an exposed portion 3 or an unexposed portion is subjected to etching, thereby producing a stamper with the inorganic resist layer 2 having the uneven pattern formed thereon (or therein). For a developer used for etching, an optimum developer for etching of the inorganic resist layer 2, such as an alkaline solution, an acid solution, pure water, or an organic solvent, can be selected, and there are no particular limitations thereon.

EXAMPLES

Hereinafter, examples of the present invention are described in detail. It is to be noted that the present invention is not limited to the following examples.

Example 1

FIGS. 1A to 1D are schematic diagrams illustrating a production method of a light transmissive stamper according to Example 1. A light transmissive support substrate 1 is a quartz glass member having an outer diameter of 120 mm and a thickness of 1.0 mm. A light transmissive inorganic resist layer and a peeling layer were formed using tungsten oxide on the upper surface and the side surface of the light transmissive support substrate in a vacuum chamber through sputtering, thereby producing a master disk for the light transmissive stamper. The sputtering at that time was performed by using a tungsten oxide target having an outer diameter of 200 mm and introducing Ar and $O_2$ gases (Ar: 15 sccm; $O_2$: 16 sccm) under a pressure of 0.4 Pa for 230 second. The thickness of the inorganic resist layer (light transmissive inorganic resist layer) formed on the upper surface of the master disk for the light transmissive stamper was 100 nm, and the thickness of the inorganic resist (peeling layer) formed on the side surface portion was 30 nm.

Next, exposure was performed on the light transmissive inorganic resist layer of the master disk for the light transmissive stamper. The light beam used for the exposure is an Ar+ ion laser having a wavelength of 351 nm. The exposure was performed at a linear velocity of 1.0 m/sec. The intensity of the exposure was set such that a groove depth after the development is 20 nm. After the exposure, wet etching was performed by use of an alkaline solution for 3 minutes to produce the light transmissive stamper patterned in a predetermined shape. For the alkaline solution, 2.38% TMAH solution was prepared as a stock solution, which was further diluted with pure water so as to prepare a solution of TMAH:pure water=1:4 for use in the wet etching.

After the development, an atomic force microscope (AFM) was used to confirm the shape of the groove, with the result that the shape of the groove was confirmed to have a depth of 20 nm. Also, the light transmissive inorganic resist layer formed through the method described above was a positive resist in which the exposed portion 3 was removed through the development.

The thickness of the light transmissive inorganic resist layer in the unexposed portion of the thus produced light transmissive stamper was 100 nm, and the thickness of the inorganic resist (peeling layer) on the side surface of the stamper was 30 nm. Accordingly, it was confirmed that the disappearance of the inorganic resist serving as the peeling layer on the side surface of the light transmissive stamper had not yet occurred.

Molding of a substrate was performed by using the thus obtained light transmissive stamper through a 2P method. A glass substrate having an outer diameter of 120 mm and a thickness of 1.15 mm was used as a support substrate for the molding. An ultraviolet curable epoxy acrylate resin (trade name: MP-121; manufactured by Mitsubishi Rayon Co., Ltd.) was used as a curable resin. The curable resin was uniformly coated on the support substrate for the molding, the light transmissive stamper was pressed against the coated curable resin, and an ultraviolet ray having a central wavelength of 365 nm and an integrated illuminance of 1,200 $mJ/cm^2$ was irradiated to cure the curable resin. At this time, it was found that the curable resin flowed out to the side surface of the light transmissive stamper. Subsequently, the curable resin was peeled off from the light transmissive stamper to obtain a molded substrate having an information pattern.

Through the method described above, the molded substrate was repeatedly produced, with the result that there was not generated molding defect or remaining of a residue of the curable resin on the light transmissive stamper.

Example 2

Figure 2A:
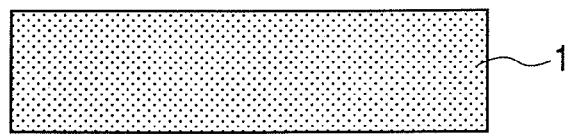
FIGS. 2A, 2B, 2C, and 2D are schematic diagrams illustrating a production method of a light transmissive stamper according to Example 2 of the present invention.
Figure 2B:
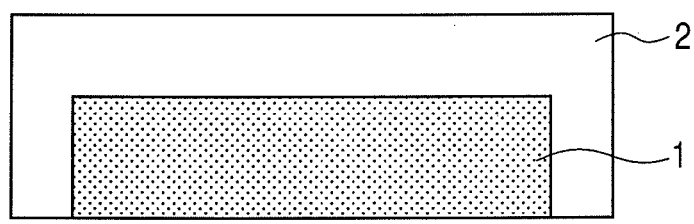
Figure 2C:
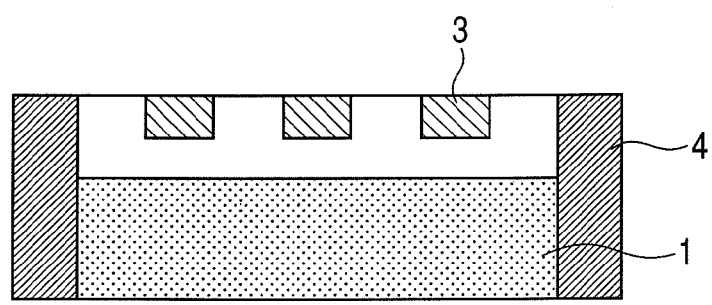
Figure 2D:
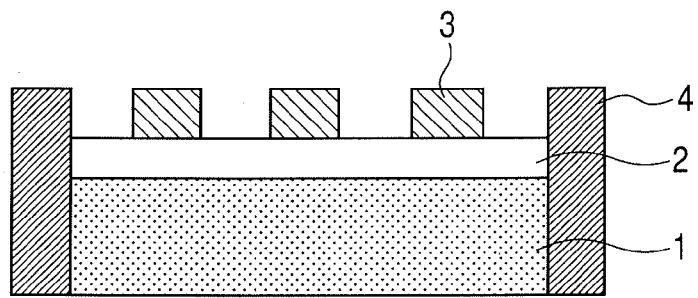

FIGS. 2A to 2D are schematic diagrams illustrating a production method of a light transmissive stamper according to Example 2. In Example 2, tungsten oxide was formed on the upper surface and the side surface of the support substrate 1 as is the case with Example 1, thereby producing a master disk for the light transmissive stamper. The conditions for the sputtering at this time were such that Ar and $O_2$ gases were introduced and the gas flow rate of Ar was set to 50 sccm and the gas flow rate of $O_2$ was set to 40 sccm. The thickness of the inorganic resist layer (light transmissive inorganic resist layer) formed on the upper surface of the master disk for the light transmissive stamper was 100 nm, and the thickness of the inorganic resist (peeling layer) formed on the side surface of the master disk for the light transmissive stamper was 30 nm. Incidentally, the inorganic resist formed by the above-mentioned method is a negative resist in which an exposure portion has etch resistance.

Next, an exposure corresponding to a predetermined information pattern was performed on the inorganic resist layer of the master disk for the light transmissive stamper. The light beam used for the exposure is an Ar+ ion laser having a wavelength of 351 nm. The exposure was performed at a linear velocity of 1.0 m/sec.

Subsequently, the inorganic resist (peeling layer) on the side surface of the master disk for the light transmissive stamper was exposed with the laser beam to be modified, thereby being provided with etch resistance. After development was performed, an atomic force microscope (AFM) was used to confirm the uneven pattern, with the result that the groove depth thereof was 20 nm.

The thickness of the inorganic resist layer in the unexposed portion of the thus produced light transmissive stamper was 80 nm, and the thickness of the exposed inorganic resist (peeling layer) on the side surface of the light transmissive stamper was 30 nm. Accordingly, it was found that, by exposing the inorganic resist on the side surface of the master disk for the light transmissive stamper to modify the resist thereby improving the etch resistance thereof, the disappearance of the inorganic resist (peeling layer) on the side surface of the light transmissive stamper obtained after the development did not occur.

Next, similarly as in Example 1, molding of a substrate was performed by using the thus obtained light transmissive stamper through a 2P method.

Even when the molding of a substrate was repeated through the 2P method, there was not generated molding defect or remaining of a residue of the curable resin on the light transmissive stamper.

In Example 2, it was found that, even when a negative inorganic resist is used, by exposing the inorganic resist formed on the side surface of the master disk for the light transmissive stamper, a peeling layer can be formed on the side surface of the light transmissive stamper, thereby improving the productivity.

Example 3

Figure 3A:
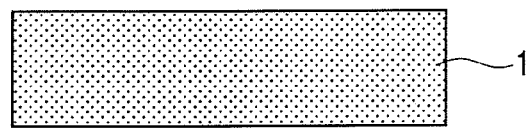
FIGS. 3A, 3B, 3C, 3D, and 3E are schematic diagrams illustrating a production method of a light transmissive stamper according to Example 3 of the present invention.
Figure 3B:
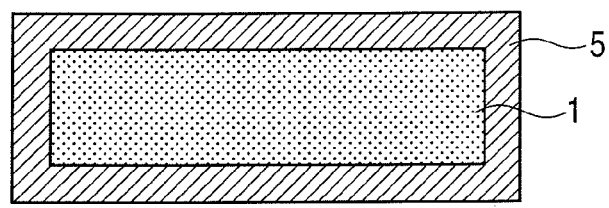
Figure 3C:
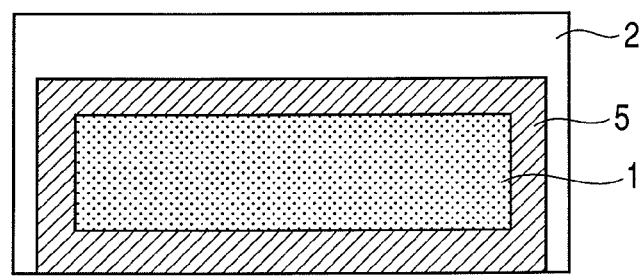
Figure 3D:
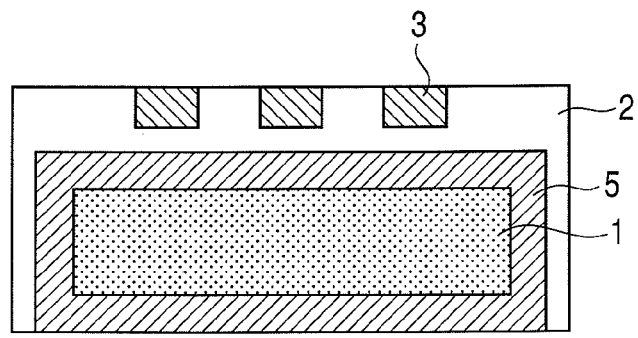
Figure 3E:
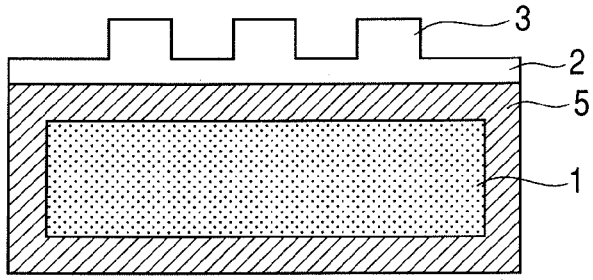

FIGS. 3A to 3E are schematic diagrams illustrating a production method of a light transmissive stamper according to Example 3.

On a support substrate (quartz glass) 1, an ultraviolet curable silicone resin (trade name: UVHC8558; manufactured by GE-Toshiba Silicone Co.) was coated through dipping and cured with ultraviolet ray irradiation to form a peeling layer 5. In this example, the ultraviolet curable resin was used, but there may be used a heat curable resin or a two-part curing resin, or there may be formed a peeling layer through a sol-gel method. The thickness of the peeling layer 5 was 1 μm both on the upper surface and on the side surface of the support substrate 1.

After the surface of the peeling layer 5 was subjected to a plasma treatment in a vacuum chamber, as is the case with Example 2, a negative inorganic resist was formed on the upper surface and on the side surface of the support substrate 1 having the peeling layer 5 formed thereon, thereby producing a master disk for the light transmissive stamper.

Subsequently, exposure and development corresponding to a predetermined information pattern were performed on the inorganic resist layer of the master disk for the stamper, thereby producing the stamper. At that time, the inorganic resist on the side surface of the master disk for the stamper was not subjected to the exposure, so that etch resistance was not provided thereto.

On the side surface of the thus obtained stamper, the inorganic resist (negative resist) was removed through the development, so that the peeling layer constituted of the curable silicone resin was exposed. The peeling layer constituted of the curable silicone resin had alkali resistance, so that disappearance thereof did not occur. The curable silicone resin exhibited satisfactory adhesion to the support substrate (in this example, quartz glass) and also had satisfactory adhesion to the inorganic resist layer due to the plasma treatment performed on the surface of the curable silicone resin itself. Further, the curable silicone resin also has excellent peelability from a curable resin used for a material of a substrate. Therefore, even when the molding of the substrate was repeated through the 2P method similarly as in Example 1, molding defect or remaining of a residue on the side surface of the stamper was not generated. Moreover, since the curable silicone resin has water repellency, it is possible to prevent the curable resin from adhering to the side surface of the stamper at the time of molding the substrate, and to prevent mold flash of the molded substrate from being generated.

Example 4

Figure 4A:
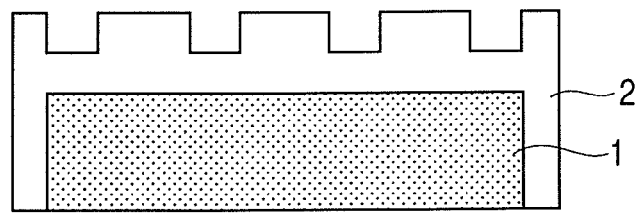
FIGS. 4A, 4B, 4C, and 4D are schematic diagrams illustrating a production method of a light transmissive stamper according to Example 4 of the present invention.
Figure 4B:
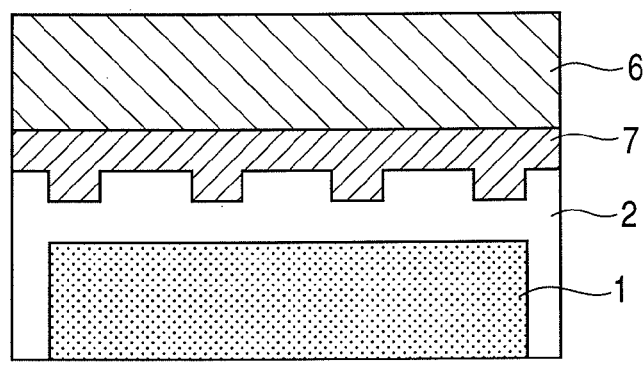
Figure 4C:
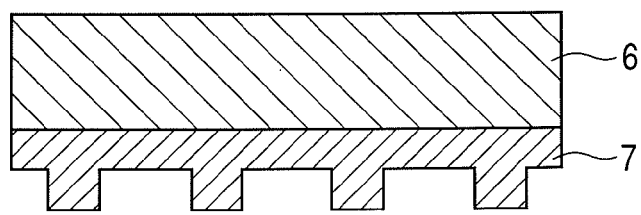
Figure 4D:
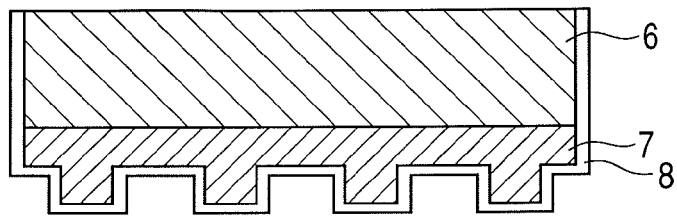

FIGS. 4A to 4D are schematic diagrams illustrating a production method of a light transmissive stamper according to Example 4.

Through the method described in Example 2, a stamper having an inorganic resist was produced. Subsequently, as a curable resin 7 for pattern transfer of the above-mentioned stamper, an ultraviolet curable epoxy acrylate resin (trade name: MP-121; manufactured by Mitsubishi Rayon Co., Ltd.) was used to produce a replica stamper. As a support substrate 6 for the replica stamper, quartz glass having an outer diameter of 120 mm and a thickness of 1.0 mm was used. Further, in this example, a silane coupling agent layer may be formed on the support substrate 6 as needed, which can improve the adhesion to the curable resin 7.

The stamper and the curable resin 7 were peeled off from each other at the boundary thereof, and thus a replica stamper to which the uneven pattern of the stamper was transferred was obtained.

Next, silicon (Si) was subjected to sputtering in a vacuum chamber to form a peeling layer 8 on the replica stamper. The thickness of the thus formed peeling layer on the replica stamper was 10 nm at the surface portion and 3 nm at the side surface portion. Incidentally, although Si was used for the peeling layer in this example, silicon nitride (SiN) can also be used as another material having transmissivity. Moreover, the thickness of the peeling layer is not limited to the thickness in this example, as long as the thickness provides transmissivity. For example, the thickness can be set to 1 to 100 nm.

The thus obtained replica stamper having the peeling layer formed thereon was used to repeat molding of a substrate through the 2P method, with the result that molding defect or remaining of a residue on the stamper was not generated.

As described above, according to the present invention, by forming the peeling layer on the side surface of the stamper, the stamper and a molded substrate or an intermediate layer can be peeled from each other easily without generating a strong adhesion force between the side surface portion of the stamper and the molded substrate or the intermediate layer formed of a curable resin.

Also, when the inorganic resist layer is formed, by forming the inorganic resist up to the side surface of the master disk of the stamper to serve as a peeling layer, even when molding of a substrate or an intermediate layer is performed with the stamper using the inorganic resist through the 2P method, remaining of a residue of the curable resin on the side surface of the stamper can be prevented. Further, by forming the peeling layer by the use of the same inorganic material as the inorganic resist layer, the stamper can be provided with good productivity without separately providing a complicated process step of forming a peeling layer.

That is, by forming the peeling layer on the side surface of the stamper, a stamper using the inorganic resist having an excellent flatness can be used more repeatedly. Further, the stamper can be utilized for producing an optical disk having a multilayer structure in which uniformity of film thickness with high accuracy is required for a curable resin layer.

Moreover, by using a material having transmissivity in the support substrate and the inorganic resist layer, when an intermediate layer of an optical recording medium having a multilayer structure is formed, there can be obtained a light transmissive stamper which enables ultraviolet ray irradiation from the stamper side and has excellent peelability from a curable resin.

While the present invention has been described with reference to an exemplary embodiment, it is to be understood that the invention is not limited to the disclosed exemplary embodiment. The scope of the following claims is to be accorded the broadest interpretation so as to encompass all such modifications and equivalent structures and functions.

This application claims priority from Japanese Patent Application No. 2007-129344 filed on May 15, 2007, which is hereby incorporated by reference herein.

What is claimed is:

1. A light transmissive stamper to be used for forming an information pattern of a medium by using a curable resin, comprising:
    a support substrate having transmissivity;
    a light transmissive inorganic resist layer provided on the support substrate and having formed therein an uneven pattern corresponding to an information pattern, the light transmissive inorganic resist layer comprising as a main component an incomplete oxide of an inorganic metal having an oxygen content less than an oxygen content of a stoichiometric composition corresponding to a valence which the inorganic metal takes; and
    a peeling layer having a higher peelability from the curable resin than a peelability from the support substrate and provided on a side surface of the support substrate.

2. The light transmissive stamper according to claim 1, wherein the incomplete oxide comprises as a main component at least one selected from the group consisting of a tungsten oxide, a molybdenum oxide, a tellurium oxide, and a mixture thereof.

3. The light transmissive stamper according to claim 2, wherein the peeling layer comprises at least one selected from the group consisting of the tungsten oxide, the molybdenum oxide, the tellurium oxide, and a mixture thereof.

4. The light transmissive stamper according to claim 1, wherein the peeling layer comprises the same incomplete oxide as contained in the light transmissive inorganic resist layer.

5. The light transmissive stamper according to claim 1, wherein the peeling layer comprises an organic material.

6. The light transmissive stamper according to claim 5, wherein the organic material is at least one selected from the group consisting of a silicone resin, a fluororesin, and a cycloolefin resin.

7. The light transmissive stamper according to claim 6, wherein the silicone resin is an ultraviolet curable silicone resin.

8. The light transmissive stamper according to claim 5, wherein the organic material further comprises a silane coupling agent.

9. The light transmissive stamper according to claim 1, wherein the medium is an optical recording medium.

* * * * *